July 7, 1964 R. R. CHACON 3,140,200
SUGAR CANE RAW JUICE CLARIFIER
Filed Nov. 30, 1962 3 Sheets-Sheet 1
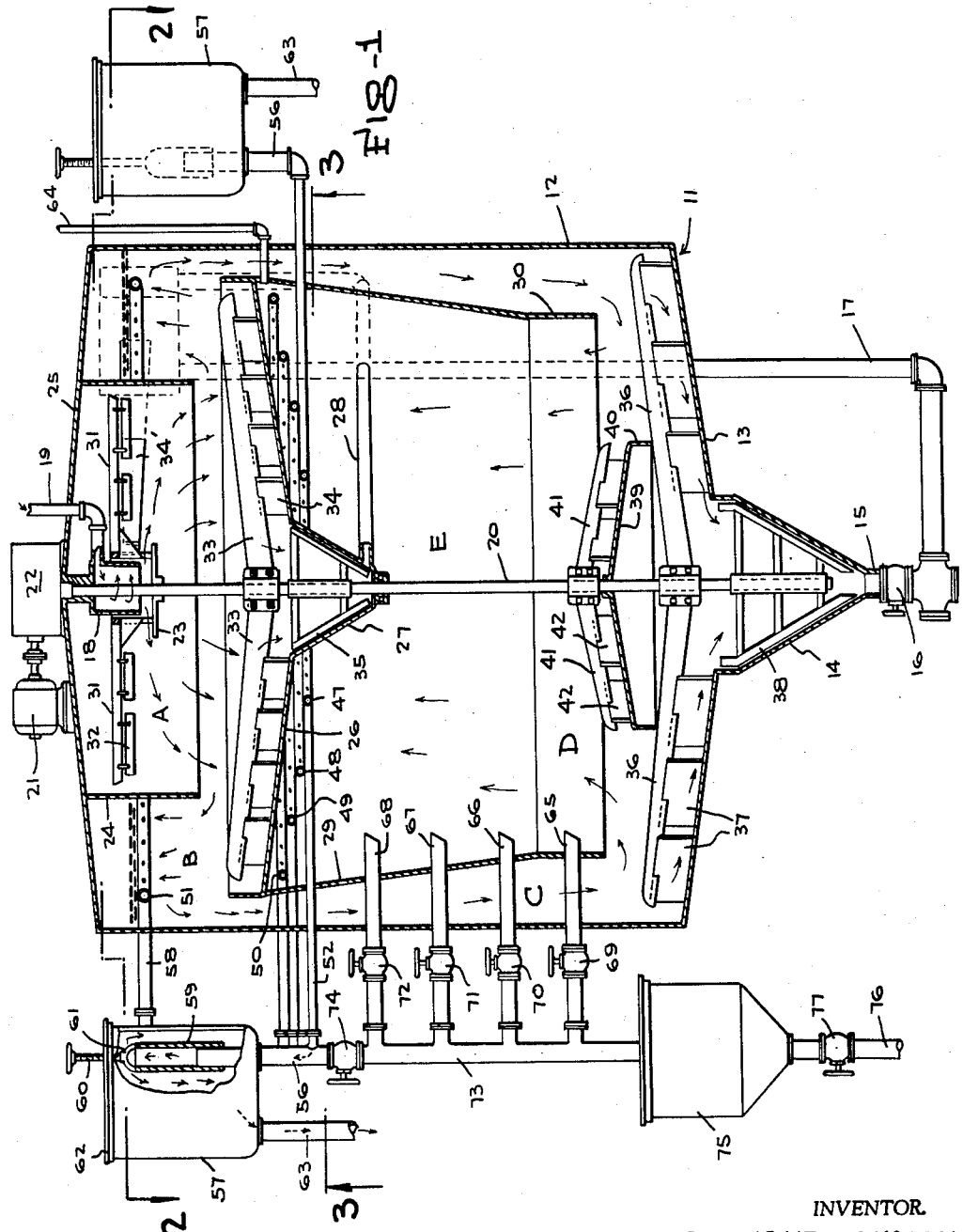
INVENTOR.
RAFAEL RODRIGUEZ CHACON
BY
McMorrow, Berman & Davidson
ATTORNEYS

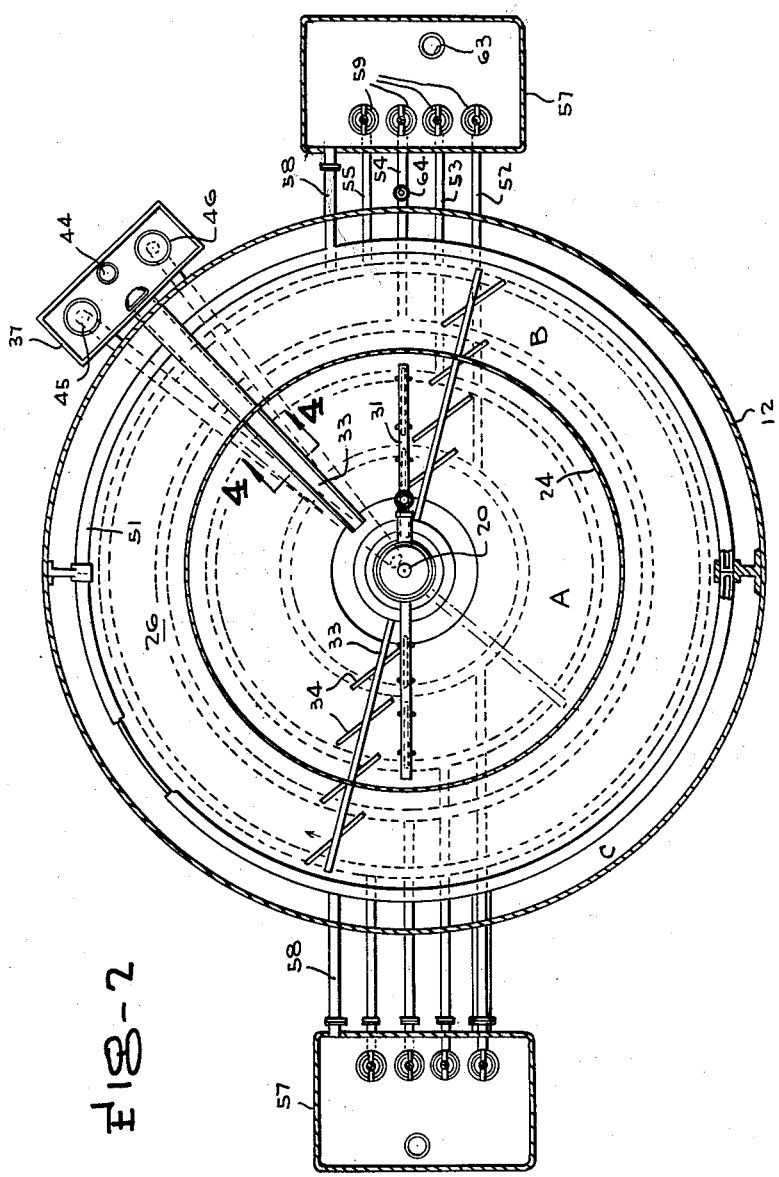

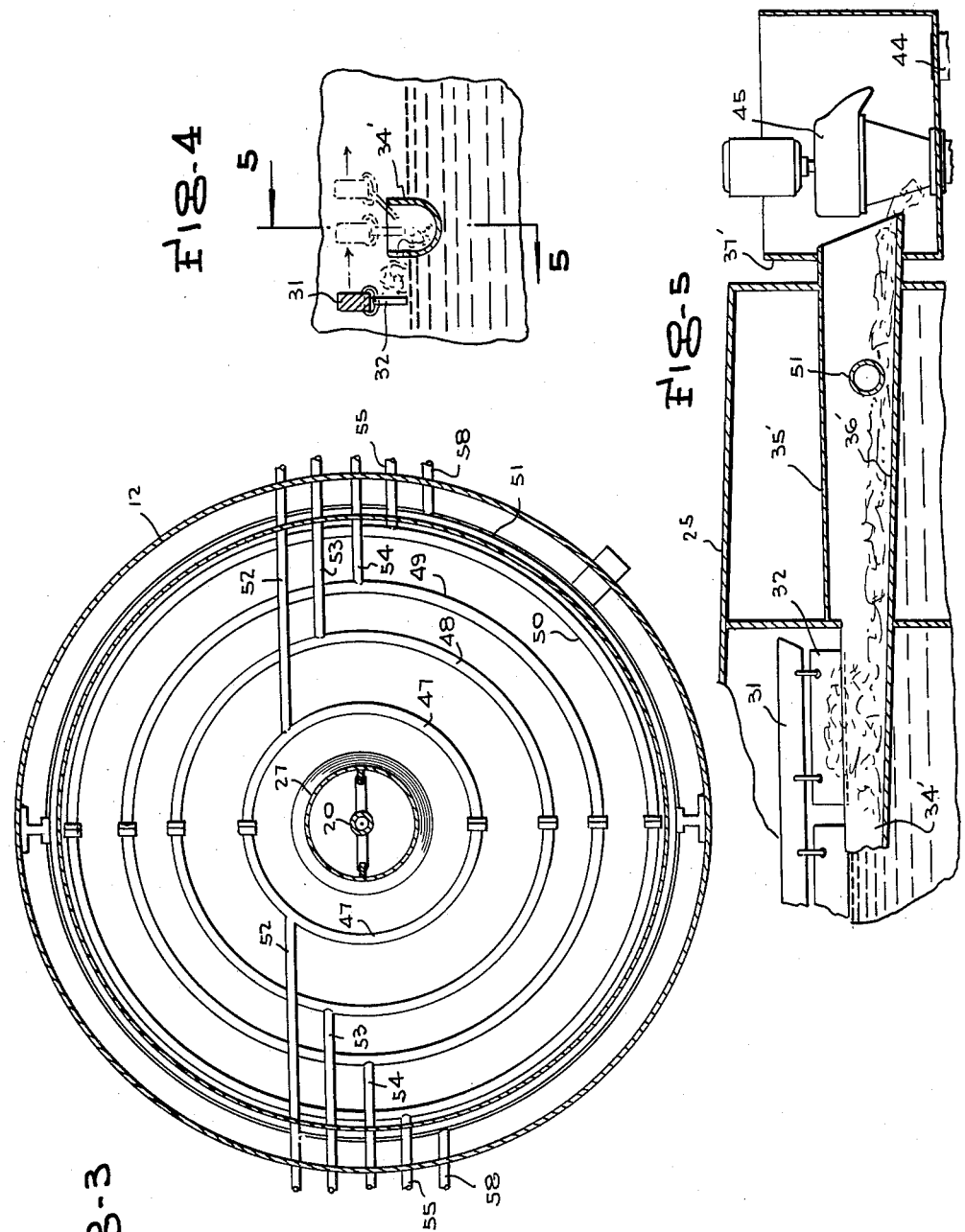

United States Patent Office 3,140,200
Patented July 7, 1964

3,140,200
SUGAR CANE RAW JUICE CLARIFIER
Rafael Rodriguez Chacon, % Porto Rico Iron Works, Inc.,
P.O. Box 1589, Ponce, Puerto Rico
Filed Nov. 30, 1962, Ser. No. 241,296
12 Claims. (Cl. 127—13)

This invention relates to apparatus for use in sugar manufacture, and more particularly to a clarifier for sugar cane raw juice.

A main object of the invention is to provide a novel and improved apparatus for use in clarifying sugar cane raw juice, the apparatus being relatively simple in construction, being easy to operate, and having a low maintenance cost.

A further object of the invention is to provide an improved apparatus for clarifying sugar cane raw juice, the apparatus providing uniform quality of the juice obtained therefrom, being arranged so that there is a minimum possibility of inversion of the sugar material therein, and being arranged so that there is no intermingling of the clarified juice and impurities separated previously therefrom.

A still further object of the invention is to provide an improved apparatus for clarifying sugar cane raw juice, the apparatus being relatively compact in size but providing a substantial settling height, first in a downward and then in an upward direction, the settling zones increasing in area so that the rate of flow of the juice passing therethrough decreases, thereby producing more effective settling of particles of solid material from the juice, all the clarified juice traveling the same distance with the same particle retention time before leaving the clarifier, whereby uniform quality of juice is obtained, all the clear juice taken from the clarifier being removed from the same level and from a collection area of considerable size, whereby full advantage is taken of the large settling area defined thereby, while at the same time maintaining uniform cross sectional flow of the juice therethrough.

A still further object of the invention is to provide an improved sugar cane raw juice clarifier which has a relatively high working capacity, which separates impurities and foreign materials from the juice in the shortest possible time with minimum possibility of inversion of the sugar material, being arranged so that there are no dead corners in the apparatus, whereby the possibility of such inversion is prevented, the clarifier having a sufficiently great capacity that sudden and continuous changes in load, as are common in most sugar production facilities will not affect its efficiency, the apparatus being easy to maintain in operating condition because it is easily accessible for cleaning, washing, or painting.

Further objects and adavntages of the invention will become apparent from the following description and claims, and from the accompanying drawings, wherein:

FIGURE 1 is a vertical cross sectional view taken through an improved sugar cane raw juice clarifying apparatus constructed in accordance with the present invention.

FIGURE 2 is a horizontal cross sectional view taken substantially on the line 2—2 of FIGURE 1.

FIGURE 3 is a horizontal cross sectional view taken substantially on the line 3—3 of FIGURE 1.

FIGURE 4 is an enlarged fragmentary vertical cross sectional view taken on the line 4—4 of FIGURE 2.

FIGURE 5 is a fragmentary vertical cross sectional view taken substantially on the line 5—5 of FIGURE 4.

The clarification of sugar cane raw juice, which is a relatively perishable liquid, requires a special treatment which is different from that acceptable in the clarification of various other materials. Solids in the sugar cane raw juice, known as "cachaza," or "mud" are very undesirable materials in the juice, since these materials tend to cause inversion of the sugar, resulting in heavy losses in the manufacturing process thereof. To minimize such losses from inversion caused by the "cachaza" or "mud," the "cachaza" or "mud" material must be separated from the juice and removed from the clarifier as rapidly as possible and there must be no possibility of the return of same to the juice after separation therefrom.

The presence of dead areas or corners in a clarifying apparatus, which tend to cause immobilization therein of quantities of sugar cane raw juice tends to cause fermentation and destruction of the sugar, resulting in relatively inefficient operation. One of the prime purposes of the present invention is to provide a sugar cane raw juice clarifying apparatus wherein there are no dead areas or corners, so that in this respect, the fermentation or destruction of the sugar passing through the clarifier will be minimized.

Another prime purpose of the present invention is to provide means whereby the "cachaza" or "mud" is removed from the clarifier as soon as it settles and is not remixed with the juice, as is the case with many other types of sugar cane raw juice clarifiers. Furthermore, it is the purpose of the present invention to provide an arrangement wherein there is a minimum possibility of inversion of the sugar in the juice as it is being clarified, whereby losses will be minimized and whereby the apparatus will provide economical and efficient results.

The theory of operation of the juice clarifying apparatus of the present invention is based on well known physical laws related to the settling of solid materials in liquids. Thus, it is well understood that settling of solid materials from liquids is most effective when the vertical settling distance, namely, the height of the material is relatively large, since the settling speed of particles increases with height. It is also well understood that faster settling takes place in areas of lower solids concentration than in areas of dense concentration, and that by increasing the free fall area, namely, the area in which settling takes place, the rate of settling will be accordingly increased.

It is also well known that where liquid is moving in an upward direction, the settling of particles of solid material from the liquid will occur unless the density or mass of the particles is overcome by the upward force exerted on the particles by the upwardly moving liquid. It is also known that by reducing the rate of upward movement of the liquid that the force exerted on the particles suspended therein will be reduced and that such particles will settle out readily if the velocity of movement upwardly of the liquid is made relatively slow.

The above physical principles are relied upon in the apparatus of the present invention and are utilized in the apparatus in a manner presently to be described.

Referring to the drawings, 11 generally designates an improved sugar cane raw juice clarifier constructed in accordance with the present invention. The clarifier 11 comprises a generally cylindrical tank 12 which is provided with five chambers or zones, designated respectively at A, B, C, D and E. Each of these chambers or zones is of ample area, height and volume, in accordance with the desired capacity of the apparatus. As will be presently explained, in passing from one chamber or zone to another, the concentration of solids, velocity and the rate of flow per square foot of the juice diminishes, with a concurrent increase of the settling rate of the solids as the juice flows through the clarifier. The juice is finally collected and removed from the clarifier in the form of a clear liquid, free of impurities.

The chambers or zones A and B constitute combined flocculating and juice removal chambers, the chamber C constitutes a downward settling zone, the chamber D constitutes a further settling zone, and the chamber E constitutes an upward settling zone wherein the liquid flows upwardly but the solid material settles downwardly therefrom.

The cylindrical tank 12 is provided with a downwardly convergent main conical bottom portion 13 provided with a relatively steep central depending conical portion 14 terminating in the mud removal conduit 15 which is connected through a valve 16 to the mud removal pipe 17. Inside the tank, at the upper central portion thereof is a downwardly opening feed chamber 18 to which is connected the feed conduit 19 for the raw sugar cane juice to be clarified.

Designated at 20 is a vertical central shaft which is suitably journaled axially in the tank 12 and which is drivingly connected at its top end to an electric motor 21 through a suitable gear reduction unit 22. Secured on the shaft 20 immediately below the open bottom end of the chamber 18 is a horizontally extending distributing baffle disc 23. Designated at 24 is a depending cylindrical shell secured to the top wall 25 of the tank, said shell being of substantial diameter and depending a substantial distance below the plane of the distributing baffle 23, the shell 24 defining the flocculating chamber A within it and being spaced from the main cylindrical wall of the tank 12 to define externally of the member 24 the annular chamber B.

Mounted in the tank 12 below the cylindrical shell or baffle member 24 is the downwardly convergent conical tray member 26 which is provided with the relatively steep depending central conical portion 27. The bottom end of the central conical portion 27 is connected to a mud discharge pipe 28. Rigidly secured to and depending from the periphery of the relatively large conical tray 26 is the depending skirt member 29 which is of downwardly convergent frusto conical shape for the major portion of its height but which terminates in the cylindrical bottom portion 30. As will be readily apparent from FIGURE 1, the downwardly convergent main portion 29 is spaced inwardly from and is coaxial with the main cylindrical wall of the tank 12, defining therewith the annular downwardly flaring space C which is of constant area only at the lower portion, namely, the portion including the cylindrical bottom element 30.

A pair of diametrically opposed skimmer arms 31, 31 are secured on the disc member 23, extending outwardly horizontally and being provided with depending pivoted skimming shoes 32. The arms 31 and their depending skimming shoes 32 are rotated by the shaft 20 and are arranged to remove skim from the top surface of the liquid present within the shell 24, moving the skim into a skim collection trough 34' communicating with the collection conduit 35', as shown in FIGURE 5, which is mounted in the tank at the upper portion thereof and which has the downwardly and outwardly inclined bottom wall 36'. The conduit 35' leads to a mud collection housing 37' mounted adjacent the top portion of the tank 12.

Secured on the shaft 20 immediately above the tray 26 are a pair of diametrically opposed scraping arms 33, 33 provided with depending scraping blades 34 which are engageable with the outer main portion of the tray 26, as shown in FIGURE 1, to scrape material therefrom, the blades 34 being arranged parallel to each other and being angled relative to the arms 33 in the manner illustrated in FIGURE 2 so as to sweep loosened material downwardly and inwardly in the tray 26 responsive to clockwise rotation of the arms 33, as viewed in FIGURE 2. Mounted on the shaft 20 within the depending central conical portion 27 is an additional scraping assembly 35 provided with scraping blade means extending closely adjacent to the inside surface of the conical portion 27 to scrape material therefrom and to assist the material in settling downwardly for discharge through the mud conduit 28.

Scraper arms 36, 36 are secured on the lower portion of shaft 20, said arms being provided with the depending scraper blades 37, similar to the blades 34, which are engageable with the surface of the main conical bottom wall portion 13 to scrape mud material therefrom and to move loosened mud material downwardly and inwardly toward the conical portion 14 at the center of the bottom wall of the tank. A scraping assembly 38, similar to the assembly 35 is mounted on the lower end portion of the shaft 20, said assembly 38 being adapted to loosen material from the inside surface of the central depending conical portion 14 and to assist said material in moving downwardly through the discharge conduit 15.

Rigidly mounted in the tank immediately above the scraper arms 36 is an upwardly convergent conical baffle member 39 having a depending cylindrical peripheral wall 40, the baffle member 39 being of substantial diameter and overlying the central portion of the bottom of tank 12, and serving as a mud pulsation eliminator, namely, as a means to prevent pulsations in the pumping flow of mud from the tank from effecting the smooth and even flow of material through the clarifier. As shown, the member 39 with its peripheral wall 40 cooperates with the depending cylindrical skirt portion 30 to define an annular passage of substantial area connecting the chamber C to the chamber D.

Secured on the shaft 20 immediately above the downwardly flaring conical baffle member 39 are a pair of scraper arms 41, 41 provided with inclined depending scraper blades 42 which are angled relative to the arms 41, the blades 42 being parallel to each other and being oriented so as to move mud material downwardly along the top surface of the member 39 responsive to the aforementioned clockwise rotation of the shaft 20.

As will be apparent from FIGURE 1, the various rotating assemblies, namely, the arms 31, 31, the scraper arms 33, 33, the scraper arms 36, 36, and the scraper arms 41, 41, as well as the downwardly converging scraper assemblies 35 and 38, are drivingly secured to the shaft 20 and rotate simultaneously therewith.

The shaft 20 may be driven through a suitable speed reducer, such as the speed reducing unit 22, as above described, by an electric motor, such as the motor 21, or by any other suitable prime mover such as a steam engine or turbine.

The mud collection housing 37' is provided with the mud outlet conduit 44 leading to a mud collection receptacle or sump. The mud conduits 28 and 17 are connected to the intake sides of respective mud pumps 45 and 46 mounted in the mud housing 37' and discharging into said mud housing, for ultimate delivery to the mud outlet conduit 44. Mounted concentrically in the top portion of the interior of the depending frusto conical shell member 29 are a plurality of tubular annular juice draw-off coils, said coils being concentrically arranged immediately below the main downwardly convergent tray 26. Said coils are designated respectively at 47, 48, 49 and 50. As shown in FIGURE 1, the coils 47 to 50 are perforated uniformly so as to freely admit clear juice into the coils from the top of the space defined within the member 29. A further perforated circular draw-off coil 51 is provided in the top portion of the tank 12, namely, in the upper portion of the annular space B, as shown in FIGURE 1.

The draw-off coils 47 to 50 are connected by respective conduits 52, 53, 54 and 55 to vertical outlet conduits 56 leading to a juice removal chamber 57. Outlet conduits 53, 56 and chambers 57 are provided on diametrically opposite sides of the tank, the coils 47, 48, 49 and 50 being similarly provided on diametrically opposite sides thereof with the outlet conduits 52 to 55, leading to the respective vertical outlet conduits 56 associated with the respective collection chambers 57. Diametrically opposed outlet conduits 58, 58 are similarly provided with the upper draw-off coil 51, leading to the respective collection chambers 57, 57.

Each chamber 57 is provided with adjustable overflow sleeves 59 which are slidably engaged on the top ends of the associated intake conduits 56, the top end of each sleeve 59 being open and being provided with vertical adjusting means for adjusting the sleeve vertically on the associated conduit 56. Thus, an externally projecting screw 60 may be provided which is threadedly engaged with suitable bracket means 61 secured on the top end of each sleeve 59, the threaded member 60 being threadedly engaged with the top cover 62 of the associated chamber 57, so that the sleeve 59 may be vertically adjusted by rotating the adjusting screw 60. Alternatively, the adjusting screw may be merely rotatably mounted and rotatably supported in the top wall 62 and may make threaded engagement with the bracket 61.

Respective outlet conduits 63, 63 are connected to the bottom portions of the chambers 57, 57, for conveying the clarified juice for further processing.

A vent pipe 64 is connected to the top portion of the space defined within the member 29 for allowing free escape of air or gases from the chamber E when the clarifier is placed in operation and when the chamber E is filling up with material.

Subjacent the juice outlet conduit 52 at one side of the clarifier and located at different levels are respective liquidating pipes 65 to 68 which extend from the interior of the central chamber defined within the members 29 and 30 through respective manual valves 69 to 72 to a vertical liquidating pipe 73. The liquidating pipe 73 is located below the conduit 56 associated with said outlet conduit 52 and is connected thereto through a manually controlled valve 74. The conduit 73 leads to a liquidating box or chamber 75, which is in turn connected to an outlet conduit 76 through a manually operated control valve 77. During normal operation of the clarifier the valve 74 is closed, but when the clarifier is to be shut down, necessitating the emptying of the clear liquid therefrom as well as other materials in the tank, the valve 74 is opened, and the valves 69 to 72 are opened, allowing the major portion of the liquid contents in the interior of tank 12 to empty into the box 75. This material may be conveyed through the conduit 76 for subsequent processing by opening the valve 77.

In operation, raw sugar cane juice is fed into the clarifier from the conduit 19 and the chamber 18 onto the rotating baffle disc 23, causing the incoming juice to flow radially outwardly in a uniform manner into the flocculating chamber A, and uniformly spread the juice in said flocculating chamber. The juice is also distributed outwardly into the annular chamber B by this action, so that the juice is spread substantially uniformly over the entire area of chambers A and B, which provides a substantial area for initial settling out of heavy solids. These initially settled-out solids collect on the tray member 26 and are swept inwardly through the depending conical central portion 27 through the mud conduit 28.

Foam and like particles which float on the surface of the liquid in chamber A are removed by the action of the skimmer arms 31 and their depending blades 32, being moved into the foam discharge trough 34' and flowing outwardly therefrom through the conduit 35' into the mud box 37'. Therefore, the juice passing from chamber A beneath the cylindrical baffle member 24 is free of floating solid material. Clear juice is collected from the upper portion of the annular chamber B through the perforated collection ring 51 and the conduits 58 extending outwardly therefrom to the juice collection boxes 57. Besides collecting the clear juice from the clarifier, the perforated ring 51 keeps the juice in circulation, avoiding the presence of stagnant juice in the top portion of the annular chamber B.

Therefore, heavy precipitates and light floating particles are removed from the material in the chambers A and B, leaving a juice for further clarification which has a relatively smaller concentration of solids and which is entirely free of light floating particles. It will be noted that juice in the chambers A and B flows radially outward over the periphery of the tray member 26 into the annular, downwardly flaring settling chamber C which is of substantial height and which increases in area downwardly, so that the velocity of the liquid is consequently decreased as it moves downwardly. The constant increase in area and volume as the liquid moves downwardly through the chamber C causes a constant drop in the rate of flow per square foot of cross sectional area and loss in velocity of the liquid promoting rapid sedimentation. Suspended matter in the chamber C falls rapidly downwardly directly to the bottom wall 13 of the clarifier where the material is constantly scraped and swept inwardly into the mud concentrating conical chamber 14, which is provided with the scraper 38 for cleaning its sides. The "cachaza" or mud collected in the conical chamber 14 is immediately removed through the mud discharge conduit 17 by the action of its associated pump 46.

The juice leaves the lower portion of the downwardly flaring annular chamber C and enters the settling zone D which is of relatively large area and wherein the liquid flows through at relatively low velocity. The liquid enters the zone D with enough velocity to uniformly distribute the juice across the entire area of said settling zone D. Due to the relatively large area of the space D, the velocity of the liquid becomes relatively low, and heavier particles remaining therein settle downwardly either to the bottom wall 13 or on the downwardly and outwardly sloping baffle member 39, leaving some lighter particles remaining in suspension in the juice.

The material collected on the member 39 is swept downwardly and outwardly by means of the scraper members 42, the scraped material falling downwardly onto the bottom wall 13 and being swept inwardly to the depending central conical chamber 14.

Besides acting as a collection member, the baffle member 39 also serves to prevent pump pulsations from being transmitted to the liquid in the clarifier.

Since the chamber E flares upwardly in area, the juice passing upwardly therein is reduced in velocity as it moves upwardly, so that the momentum of the upward flow decreases sufficiently to allow particles in the juice to settle downwardly by gravity, so that further particle separation occurs in the zones D and E, the particles falling downwardly onto the member 39 and to the bottom wall 13, in the manner above described.

Due to the settling action of the lighter particles in the chamber E, and due to the progressively increased settling action as the liquid rises in said chamber, the upper liquid therein will be substantially completely clarified and clear. The zone of clarified liquid is of substantial height, so that fluctuations in load will not interfere with the quality of the clarified liquid, since the large depth of the layer of clear liquid above the settling zone D plus the increase in area in the chamber E will prevent any possibility of rising particles reaching the level at which the clear liquid is discharged, even under conditions of severe changes in rate of input or output of material to or from the clarifier. Therefore, the clarifier is well suited for use in situations subject to rapid fluctuations in capacity or loading, for example, in the usual sugar factory where the grinding rate of the sugar mill changes rapidly.

It will be noted that the greatest period of retention of the juice in the clarifier occurs in the upper portion of the settling zone E, thus giving the lightest particles in the liquid the greatest amounts of settling time, and avoiding turbidity in this area.

It will be further noted that the collection coils 47 to 50 are located substantially at the highest level in the final settling chamber E, said coils being located in a region containing the most completely clarified juice, the coils being very close in level and thereby providing substantially uniform quality of juice collected thereby. It will be further noted that the concentrically arranged coils 47 to 50 are distributed substantially uniformly over the cross sectional area of the annular top portion of the final settling chamber E, whereby substantially uniform cross sectional flow of the clarified juice is maintained. The inner coil 47 and the outer coil 50 collect the clear juice from the only two corner portions present in the clarifier, thus eliminating the only two possible areas where stagnant liquid is likely to collect.

As previously mentioned, the clear juice collected by the coils 47 to 50 is discharged by overflow from the vertically adjustable sleeve members 59 into the juice collection chambers 57. The rate of flow of the collected juice may be regulated by raising or lowering the sleeves 59, which not only regulates the rate of flow of the liquid through the clarifier but also controls the juice level therein.

When the clarifier is to be emptied, the valves 69 to 72 and 74 are opened, allowing the juice to drain into the liquidating chamber 75. The valve 77 is likewise opened and the juice is pumped through the conduit 76 to the evaporators associated with the sugar cane processing plant. Normally, when the clarifier is in operation, the valves 69 to 72 and 74 are closed.

It will be noted that the design of the clarifier is relatively simple, requiring only one tray and three scraping or sweeping assemblies, and that the cost of maintaining the apparatus in proper operating condition is relatively low, since access to the interior of the tank 12 may be easily provided by the provision of a manhole in any suitable location of the bottom wall 13. There is substantial head room inside the tank so that operations such as cleaning, washing and painting inside the clarifier tank are relatively easy to perform.

While a specific embodiment of an improved sugar cane raw juice clarifier has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A sugar cane raw juice clarifier comprising a generally cylindrical tank having a top wall and a downwardly convergent, substantially conical bottom wall, a vertical shaft journaled axially in said tank, means to drive said shaft, sugar cane raw juice inlet means connected to the center portion of said top wall, a depending substantially cylindrical skirt member axially secured to said top wall and defining a flocculating space therein, a froth channel radially mounted in the top portion of the tank and extending into said flocculating space, a horizontal sweep arm secured on said shaft immediately above the top plane of said froth channel, a horizontal baffle plate secured on said shaft below said sweep arm to deflect liquid outwardly in said flocculating space, a downwardly convergent generally conical tray member mounted axially in said tank and spaced below and being substantially larger in diameter than said skirt member, a sweep arm secured on said shaft and having depending scraper means engageable with said tray member, a first mud discharge conduit connected to the bottom of said tray member, said skirt member defining with the upper portion of the cylindrical wall of the tank an annular settling chamber, a downwardly convergent frusto conical shell member of substantial height secured to the periphery of said tray member and defining with the cylindrical wall of said tank a downwardly flaring annular further settling chamber, an additional sweep arm secured on said shaft and having depending scraper means engageable with the bottom wall of the tank, a second mud discharge conduit connected to the bottom end of said bottom wall, a juice collection chamber, an apertured annular juice collection conduit mounted in the upper portion of said first-named annular settling chamber, conduit means connecting said collection conduit to said juice collection chamber, at least one additional apertured annular juice collection conduit mounted in the upper portion of the interior of said shell member, and further conduit means connecting said last-named collection conduit to said collection chamber.

2. A sugar cane raw juice clarifier comprising a generally cylindrical tank having a top wall and a downwardly convergent, substantially conical bottom wall, a vertical shaft journaled axially in said tank, means to drive said shaft, sugar cane raw juice inlet means connected to the center portion of said top wall, a depending substantially cylindrical skirt member axially secured to said top wall and defining a flocculating space therein, a froth channel radially mounted in the top portion of the tank and extending into said flocculating space, a horizontal sweep arm secured on said shaft immediately above the top plane of said froth channel, a horizontal baffle plate secured on said shaft below said sweep arm to deflect liquid outwardly in said flocculating space, a downwardly convergent generally conical tray member mounted axially in said tank and spaced below and being substantially larger in diameter than said skirt member, a sweep arm secured on said shaft and having depending scraper means engageable with said tray member, a first mud discharge conduit connected to the bottom of said tray member, said skirt member defining with the upper portion of the cylindrical wall of the tank an annular settling chamber, a downwardly convergent substantially frusto conical shell member of substantial height secured to the periphery of said tray member and defining with the cylindrical wall of said tank a downwardly flaring annular further settling chamber, an additional sweep arm secured on said shaft and having depending scraper means engageable with the bottom wall of the tank, a second mud discharge conduit connected to the bottom end of said bottom wall, a juice collection chamber, an apertured annular juice collection conduit mounted in the upper portion of said first-named annular settling chamber, conduit means connecting said collection conduit to said juice collection chamber, at least one additional apertured annular juice collection conduit mounted in the upper portion of the interior of said shell member, further conduit means connecting said last-named collection conduit to said collection chamber, a downwardly divergent conical baffle member axially mounted in the tank immediately above said additional sweep arm and being substantially smaller in diameter than the bottom end of said shell member, and a further sweep arm secured on said shaft above said last-named baffle member and having depending scraper means engageable with said last-named baffle member.

3. A sugar cane raw juice clarifier comprising a generally cylindrical tank having a top wall and a downwardly convergent, substantially conical bottom wall, a vertical shaft journaled axially in said tank, means to drive said shaft, sugar cane raw juice inlet means connected to the center portion of said top wall, a depending substantially cylindrical skirt member axially secured to said top wall and defining a flocculating space therein, a froth channel radially mounted in the top portion of the tank and extending into said flocculating space, a horizontal sweep arm secured on said shaft immediately above the top plane of said froth channel, a horizontal baffle plate secured on said shaft below said sweep arm to deflect liquid outwardly in said flocculating space, a downwardly convergent general conical tray member mounted axially in said tank and spaced below and being substantially larger in diameter than said skirt member, a sweep arm secured on said shaft and having depending scraper means engageable with said tray member, a first mud discharge conduit connected to the bottom of said tray member, said skirt member defining with the upper portion of the cylindrical wall of the tank an annular settling chamber, a downwardly convergent substantially frusto conical shell member of substantial height secured to the periphery of said tray member and defining with the cylindrical wall of said tank a downwardly flaring annular further settling chamber, an additional sweep arm secured on said shaft and having depending scraper means engageable with the bottom wall of the tank, a second mud discharge conduit connected to the bottom end of said bottom wall, a juice collection chamber, an apertured annular juice collection conduit mounted in the upper portion of said first-named annular settling chamber, conduit means connecting said collection conduit to said juice collection chamber, at least one additional apertured annular juice collection conduit mounted in the upper portion of the interior of said shell member, and further conduit means connecting said last-named collection conduit to said collection chamber, said tray member and the bottom wall of the tank being provided at their centers with relatively steep conical depending discharge portions.

4. A sugar cane raw juice clarifier comprising a generally cylindrical tank having a top wall and a downwardly convergent substantially conical bottom wall, a vertical shaft journaled axially in said tank, means to drive said shaft, sugar cane raw juice inlet means connected to the center portion of said top wall, a depending substantially cylindrical skirt member axially secured to said top wall and defining a flocculating space therein, a froth channel radially mounted in the top portion of the tank and extending into said flocculating space, a horizontal sweep arm secured on said shaft immediately above the top plane of said froth channel, a horizontal baffle plate secured on said shaft below said sweep arm to deflect liquid outwardly in said flocculating space, a downwardly convergent generally conical tray member mounted axially in said tank and spaced below and being substantially larger in diameter than said skirt member, a sweep arm secured on said shaft and having depending scraper means engageable with said tray member, a first mud discharge conduit connected to the bottom of said tray member, said skirt member defining with the upper portion of the cylindrical wall of the tank an annular settling chamber, a downwardly convergent substantially frusto conical shell member of substantial height secured to the periphery of said tray member and defining with the cylindrical wall of said tank a downwardly flaring annular further settling chamber, an additional sweep arm secured on said shaft and having depending scraper means engageable with the bottom wall of the tank, a second mud discharge conduit connected to the bottom end of said bottom wall, a juice collection chamber, an apertured annular juice collection conduit mounted in the upper portion of said first-named annular settling chamber, conduit means connecting said collection conduit to said juice collection chamber, at least one additional apertured annular juice collection conduit mounted in the upper portion of the interior of said shell member, further conduit means connecting said last-named collection conduit to said collection chamber, a downwardly divergent conical baffle member axially mounted in the tank immediately above said additional sweep arm and means substantially smaller in diameter than the bottom end of said shell member, and a further sweep arm secured on said shaft above said last-named baffle member and having depending scraper means engageable with said last-named baffle member, said tray member and the bottom wall of the tank being provided at their centers with relatively steep conical depending discharge portions.

5. A sugar cane raw juice clarifier comprising a generally cylindrical tank having a top wall and a downwardly convergent substantially conical bottom wall, a vertical shaft journaled axially in said tank, means to drive said shaft, sugar cane raw juice inlet means connected to the center portion of said top wall, a substantially cylindrical skirt member depending from and secured to said top wall coaxially with said tank and defining a flocculating space therein, a froth channel radially mounted in the top portion of the tank and extending into said flocculating space, a sweep arm secured on said shaft immediately above the top plane of said froth channel, a baffle plate secured on said shaft below said sweep arm to deflect liquid outwardly in said flocculating space, a downwardly convergent, generally conical tray member mounted axially in said tank and spaced below and being substantially larger in diameter than said skirt member, a sweep arm secured on said shaft and having depending scraper means engageable with said tray member, a first mud discharge conduit connected to the bottom of said tray member, said skirt member defining with the upper portion of the cylindrical wall of the tank an annular settling chamber, a downwardly convergent substantially frusto conical shell member of substantial height secured to the periphery of said tray member and defining with the cylindrical wall of said tank a downwardly flaring annular further settling chamber, an additional sweep arm secured on said shaft and having depending scraper means engageable with the bottom wall of the tank, a second mud discharge conduit connected to the bottom end of said bottom wall, a juice collection chamber, an apertured annular juice collection conduit mounted in the upper portion of said first-named annular settling chamber, conduit means connecting said collection conduit to said juice collection chamber, at least one additional apertured annular juice collection conduit mounted in the upper portion of the interior of said shell member, further conduit means connecting said last-named collection conduit to said collection chamber, a mud collection chamber, and conduit means connecting said froth channel and mud discharge conduit to said mud collection chamber.

6. A sugar cane raw juice clarifier comprising a generally cylindrical tank having a top wall and a downwardly convergent substantially conical bottom wall, a vertical shaft journaled axially in said tank, means to drive said shaft, sugar cane raw juice inlet means connected to said top wall, a depending substantially cylindrical skirt member axially secured to said top wall and defining a flocculating space therein, a froth channel radially mounted in the top portion of the tank and extending into said flocculating space, a sweep arm secured on said shaft immediately above the top plane of said froth channel, a baffle plate secured on said shaft below said sweep arm to deflect liquid outwardly in said flocculating space, a downwardly convergent generally conical tray member mounted axially in said tank and spaced below and being substantially larger in diameter than said skirt member, a sweep arm secured on said shaft and having depending scraper means engageable with said tray member, a first mud discharge conduit connected to the bottom of said tray member, said skirt member defining with the upper portion of the cylindrical wall of the tank an annular settling chamber, a downwardly convergent substantially frusto conical shell member of substantial height secured to the periphery of said tray member and defining with the cylindrical wall of said tank a downwardly flaring annular further settling chamber, an additional sweep arm secured on said shaft and having depending scraper means engageable with the bottom wall of the tank, a second mud discharge conduit connected to the bottom end of said bottom wall, a juice collection chamber, an apertured annular juice collection conduit mounted in the upper portion of said first-named annular settling chamber, conduit means connecting said collection conduit to said juice collection chamber, at least one additional apertured annular juice collection conduit mounted in the upper portion of the interior of said shell member, further conduits means connecting said last-named collection conduit to said collection chamber, a downwardly convergent conical baffle member axially mounted in the tank immeditially above said additional sweep arm and being substantially smaller in diameter than the bottom end of said shell member, a further sweep arm secured on said shaft above said last-named baffle member and having depending scraper means engageable with said last-named baffle member, said tray member and the bottom wall of the tank being provided at their centers with relatively steep conical depending discharge portions, a mud collection chamber, and conduit means connecting said froth channel and mud discharge conduits to said mud collection chamber.

7. A sugar cane raw juice clarifier comprising a generally cylindrical tank having a top wall and a downwardly convergent substantially conical bottom wall, a vertical shaft journaled axially in said tank, means to drive said shaft, sugar cane raw juice inlet means connected to said top wall, a depending substantially cylindrical skirt member axially secured to said top wall and defining a flocculating space therein, a froth channel radially mounted in the top portion of the tank and extending into said flocculating space, a sweep arm secured on said shaft immediately above the top plane of said froth channel, a baffle plate secured on said shaft below said sweep arm to deflect liquid outwardly in said flocculating space, a downwardly convergent generally conical tray member mounted axially in said tank and spaced below and being substantially larger in diameter than said skirt member, a sweep arm secured on said shaft and having depending scraper means engageable with said tray member, a first mud discharge conduit connected to the bottom of said tray member, said skirt member defining with the upper portion of the cylindrical wall of the tank an annular settling chamber, a downwardly convergent substantially frusto conical shell member of substantial height secured to the periphery of said tray member and defining with the cylindrical wall of said tank a downwardly flaring annular further settling chamber, an additional sweep arm secured on said shaft and having depending scraper means engageable with the bottom wall of the tank, a second mud discharge conduit connected to the bottom end of said bottom wall, a juice collecting chamber, an apertured annular juice collection conduit mounted in the upper portion of said first-named annular settling chamber, conduit means connecting said collection chamber to the upper portion of said juice collection chamber, at least one additional apertured annular juice collection conduit mounted in the upper portion of the interior of the shell member, a vertical overflow conduit in said collection chamber, and further conduit means connecting said last-named collection conduit to the lower end of said overflow conduit.

8. A sugar cane raw juice clarifier comprising a generally cylindrical tank having a top wall and a downwardly convergent substantially conical bottom wall, a vertical shaft journaled axially in said tank, means to drive said shaft, sugar cane raw juice inlet means connected to said top wall, a depending skirt member secured to said top wall and defining a flocculating space therein in communication with said inlet means, a froth channel mounted in the top portion of the tank and extending into said flocculating space, a sweep arm secured on said shaft immediately above the top plane of said froth channel, a baffle plate secured on said shaft below said sweep arm to deflect liquid outwardly in said flocculating space, a downwardly convergent, generally conical tray member mounted axially in said tank and spaced below and being substantially larger in diameter than said skirt member, a sweep arm secured on said shaft and having depending scraper means engageable with said tray member, a first mud discharge conduit connected to the bottom of said tray member, said skirt member defining with the upper portion of the cylindrical wall of the tank an annular settling chamber, a downwardly convergent substantially frusto conical shell member of substantial height secured to the periphery of said tray member and defining with the cylindrical wall of the tank a downwardly flaring annular further settling chamber, an additional sweep arm secured on said shaft and having depending scraper means engageable with the bottom wall of the tank, a second mud discharge conduit connected to the bottom end of said bottom wall, a juice collection chamber, an apertured annular juice collection conduit mounted in the upper portion of said first-named annular settling chamber, conduit means connecting said collection conduit to the upper portion of said juice collection chamber, at least one additional apertured annular juice collection conduit mounted in the upper portion of the interior of said shell member, vertically adjustable overflow conduit means mounted vertically in said collection chamber, and further conduit means communicatively connecting said last-named collection conduit to the lower end of said vertically adjustable overflow conduit.

9. A sugar cane raw juice clarifier comprising a generally cylindrical tank having a top wall and a downwardly convergent substantially conical bottom wall, a vertical shaft journaled axially in said tank, means to drive said shaft, sugar cane raw juice inlet means connected to the center portion of said top wall, a depending substantially cylindrical skirt member axially secured to said top wall and defining a flocculating space therein, a froth channel radially mounted in the top portion of the tank and extending into said flocculating space, a horizontal sweep arm secured on said shaft immediately above the top plane of said froth channel, a horizontal baffle plate secured on said shaft below said sweep arm to deflect liquid outwardly in said flocculating space, a downwardly convergent generally conical tray member mounted axially in said tank and spaced below and being substantially larger in diameter than said skirt member, a sweep arm secured on said shaft and having depending scraper means engageable with said tray member, a first mud discharge conduit connected to the bottom of said tray member, said skirt member defining with the upper portion of the cylindrical wall of the tank an annular settling chamber, a downwardly convergent substantially frusto conical shell member of substantial height secured to the periphery of said tray member and defining with the cylindrical wall of said tank a downwardly flaring annular further settling chamber, an additional sweep arm secured on said shaft and having depending scraper means engageable with the bottom wall of the tank, a second mud discharge conduit connected to the bottom end of said bottom wall, a juice collection chamber, an apertured annular juice collection conduit mounted in the upper portion of said first-named annular settling chamber, conduit means connecting said collection conduit to the upper portion of said juice collection chamber, at least one additional apertured annular juice collection conduit mounted in the upper portion of the interior of said shell member, a downwardly divergent conical baffle member axially mounted in the tank immediately above said additional sweep arm and being substantially smaller in diameter than the bottom end of said shell member, a further sweep arm secured on said shaft above said last-named baffle member and having depending scraper means engageable with said last-named baffle member, said tray member and the bottom wall of the tank being provided at their centers with relatively steep conical depending discharge portions, a mud collection chamber, conduit means connecting said froth channel and mud discharge conduit to said mud collection chamber, vertically adjustable overflow conduit means mounted vertically in said juice collection chamber, and further conduit means communicatively connecting the juice collection conduit to the lower end of said vertically adjustable overflow conduit.

10. A sugar cane raw juice clarifier comprising a generally cylindrical tank having a top wall and a downwardly convergent substantially conical bottom wall, a vertical shaft journaled axially in said tank, means to drive said shaft, sugar cane raw juice inlet means connected to said top wall, a depending substantially cylindrical skirt member axially secured to said top wall and defining a flocculating space therein, a froth channel mounted in the top portion of the tank and extending into said flocculating space, a sweep arm secured on said shaft immediately above the top plane of said froth channel, a baffle plate secured on said shaft below said sweep arm to deflect liquid outwardly in said flocculating space, a downwardly convergent, generally conical tray member mounted axially in said tank and spaced below and being substantially larger in diameter than said skirt member, a sweep arm secured on said shaft and having depending scraper means engageable with said tray member, a first mud discharge conduit connected to the bottom of said tray member, said skirt member defining with the upper portion of the cylindrical wall of the tank an annular settling chamber, a downwardly convergent substantially frusto conical shell member of substantial height secured to the periphery of said tray member and defining with the cylindrical wall of said tank a downwardly flaring annular further settling chamber, an additional sweep arm secured on said shaft and having depending scraper means engageable with the bottom wall of the tank, a second mud discharge conduit connected to the bottom end of said bottom wall, a juice collection chamber, an apertured annular juice collection conduit mounted in the upper portion of said first-named annular settling chamber, conduit means connecting said collection conduit to the upper portion of said juice collection chamber, at least one additional apertured annular juice collection conduit mounted in the upper portion of the interior of said shell member, a vertical overflow conduit in said collection chamber, further conduit means connecting said last-named collection conduit to the lower end of said overflow conduit, a liquidating chamber, conduit means including a control valve connecting said further conduit means to said liquidating chamber, and at least one liquidating conduit including a control valve connecting said last-named conduit means to the interior of said shell member.

11. A sugar cane raw juice clarifier comprising a generally cylindrical tank having a top wall and a downwardly convergent substantially conical bottom wall, a vertical shaft journaled axially in said tank, means to drive said shaft, sugar cane raw juice inlet means connected to said top wall, a depending substantially cylindrical skirt member secured to said top wall and defining a flocculating space communicating with said inlet means, a froth channel mounted in the top portion of the tank and extending into said flocculating space, a sweep arm secured on said shaft immediately above the top plane of said froth channel, a baffle plate secured on said shaft below said sweep arm to deflect liquid outwardly in said flocculating space, a downwardly tapering tray member mounted axially in said tank and spaced below and being substantially larger in diameter than said skirt member, a sweep arm secured on said shaft and having depending scraper means engageable with said tray member, a first mud discharge conduit connected to the bottom of said tray member, said skirt member defining with the upper portion of the cylindrical wall of the tank a circumferentially extending settling chamber, a depending shell member secured to the periphery of said tray member and being of substantial height, defining with the cylindrical wall of the tank a further circumferentially extending settling chamber, an additional sweep arm secured on said shaft and having depending scraper means engageable with the bottom wall of the tank, a second mud discharge conduit connected to the bottom end of said bottom wall, a juice collection chamber, an apertured substantially ring-shaped juice collection conduit mounted in the upper portion of said first-named settling chamber, conduit means connecting said collection conduit to said juice collection chamber, at least one additional apertured substantially ring-shaped juice collection conduit mounted in the upper portion of the interior of said shell member, and further conduit means connecting said last-named collection conduit to said collection chamber.

12. A sugar cane raw juice clarifier comprising a generally cylindrical tank having a top wall and a downwardly convergent substantially conical bottom wall, a vertical shaft journaled axially in said tank, means to drive said shaft, sugar cane raw juice inlet means connected to said top wall, a depending substantially cylindrical skirt member secured to said top wall and defining a flocculating space in communication with said inlet means, a froth channel mounted in the top portion of the tank and extending into said flocculating space, a sweep arm secured on said shaft immediately above the top plane of said froth channel, a baffle plate secured on said shaft below said sweep arm to deflect liquid outwardly in said flocculating space, a downwardly convergent generally conical tray member mounted axially in said tank and spaced below and being substantially larger in diameter than said skirt member, a sweep arm secured on said shaft and having depending scraper means engageable with said tray member, a first mud discharge conduit connected to the bottom of said tray member, said skirt member defining with the upper portion of the cylindrical wall of the tank a substantially annular settling chamber, a downwardly convergent substantially frusto conical shell member of substantial height secured to the periphery of said tray member and defining with the cylindrical wall of said tank a downwardly flaring annular further settling chamber, an additional sweep arm secured on said shaft and having depending scraper means engageable with the bottom wall of the tank, a second mud discharge conduit connected to the bottom end of said bottom wall, a juice collection chamber, an apertured substantially ring-shaped juice collection conduit mounted in the upper portion of said first-named annular settling chamber, conduit means connecting said collection conduit to said juice collection chamber, at least one additional apertured substantially ring-shaped juice collection conduit mounted in the upper portion of the interior of said shell member, and further conduit means connecting said last-named collection conduit to said collection chamber.

References Cited in the file of this patent
UNITED STATES PATENTS

| | | |
|---|---|---|
| 2,103,796 | Seip | Dec. 28, 1937 |
| 2,488,851 | Copp | Nov. 22, 1949 |